March 7, 1961

J. A. TYLLE 2,973,756

FOOD CONTAINER

Filed July 10, 1958

INVENTOR
JOHN A. TYLLE

BY Gustave Miller
ATTORNEY

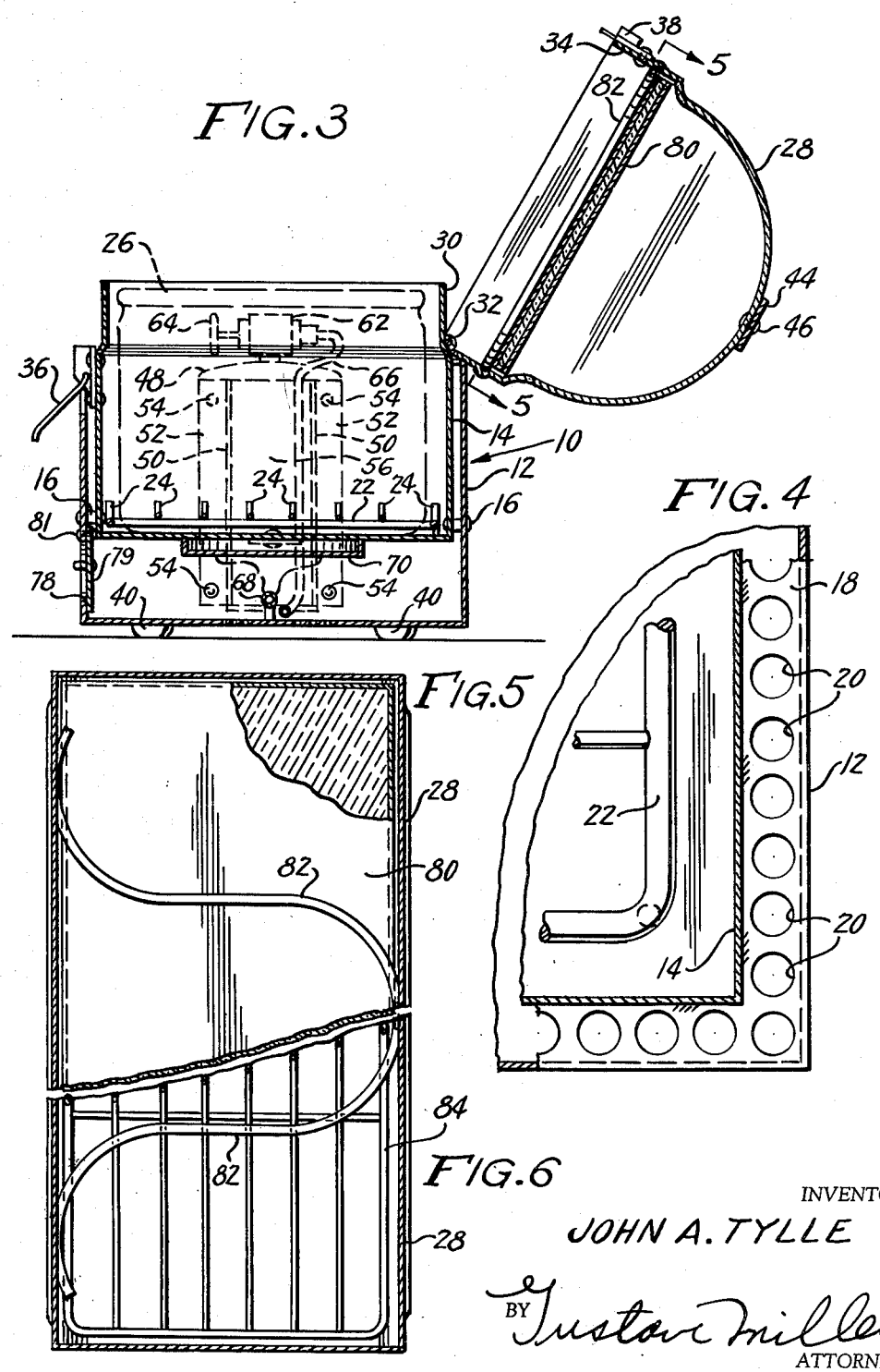

2,973,756
Patented Mar. 7, 1961

2,973,756

FOOD CONTAINER

John A. Tylle, E. 8th St., Columbus, Nebr.

Filed July 10, 1958, Ser. No. 747,671

4 Claims. (Cl. 126—266)

This invention relates to a food container, and it particularly relates to a food container of the type generally known as a "lunch box."

Heretofore, lunch boxes generally were used to hold cold foods such as sandwiches, cakes, pies, fruits, and the like, as well as a thermos bottle for hot or cold liquids. This thermos bottle is necessarily large in size relative to its liquid holding capacity because of the large amount of insulation required. Consequently, although only a relatively small amount of liquid can be carried in the lunch box, the bottle takes up so much space that insufficient space is left for the other types of foods.

It is one object of the present invention to overcome the above deficiencies of the prior types of lunch boxes by providing a lunch box which can hold not only a larger amount and greater variety of foods but which can retain the foods in heated condition when so desired.

Another object of the present invention is to provide lunch boxes of the above type which are simple in construction and safe to use.

Other objects of the present invention are to provide an improved lunch box, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 3 is a sectional view taken on line 3—3 of Fig. 1 except that the lid is in open position.

Fig. 4 is a fragmentary view taken on line 4—4 of Fig. 1.

Fig. 5 is a sectional view taken on line 5—5 of Fig. 3, with parts broken away at one end.

Fig. 6 is a view similar to Fig. 5 but showing the opposite end broken away.

Figure 1:
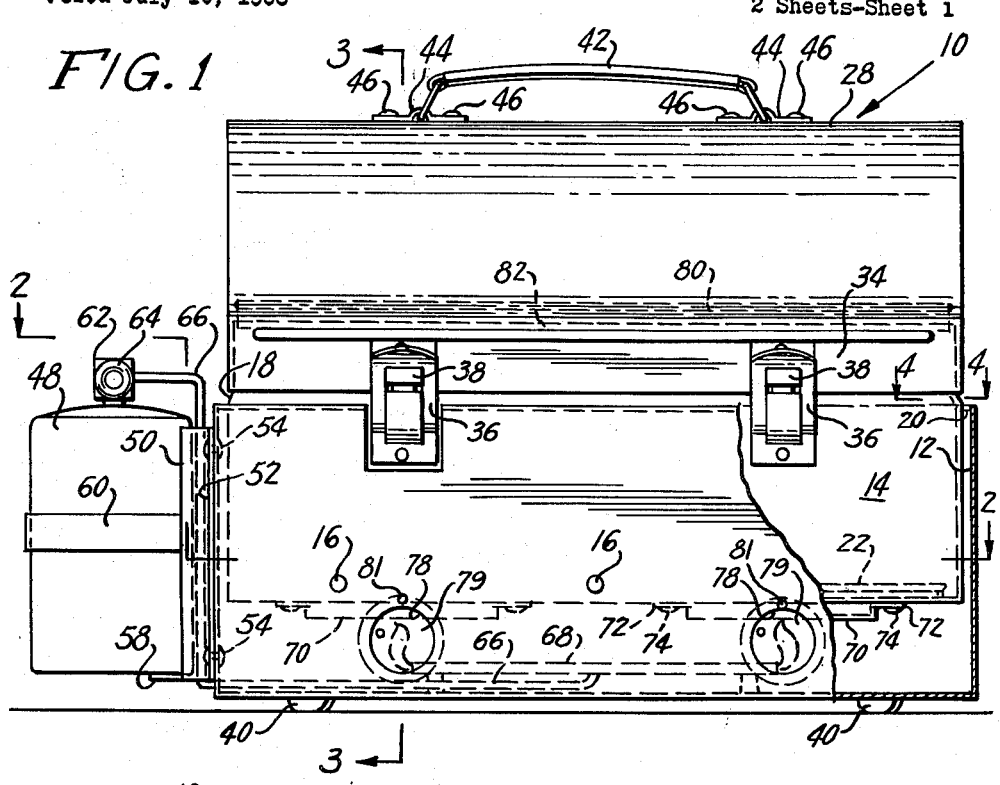
Fig. 1 is a side elevational view of an assembled unit embodying the present invention, parts being broken away to show the interior thereof.

Referring in greater detail to the drawings wherein similar reference characters refer to similar parts, there is shown a container or lunch box, generally designated 10, comprising an outer casing 12 and an inner container 14. The casing 12 may be made of aluminum or any other desirable material while the container 14 may be made of iron, tin, aluminum or any other desirable material.

The container 14 is held in spaced relation to the casing 12 by means of spacers 16 held in place by screws, bolts, rivets or the like. At the upper edge of casing 12 the space between casing 12 and container 14 is closed by a peripheral plate or strip 18. This strip 18 is provided with a series of vent holes 20 (as best seen in Fig. 4).

Figure 2:
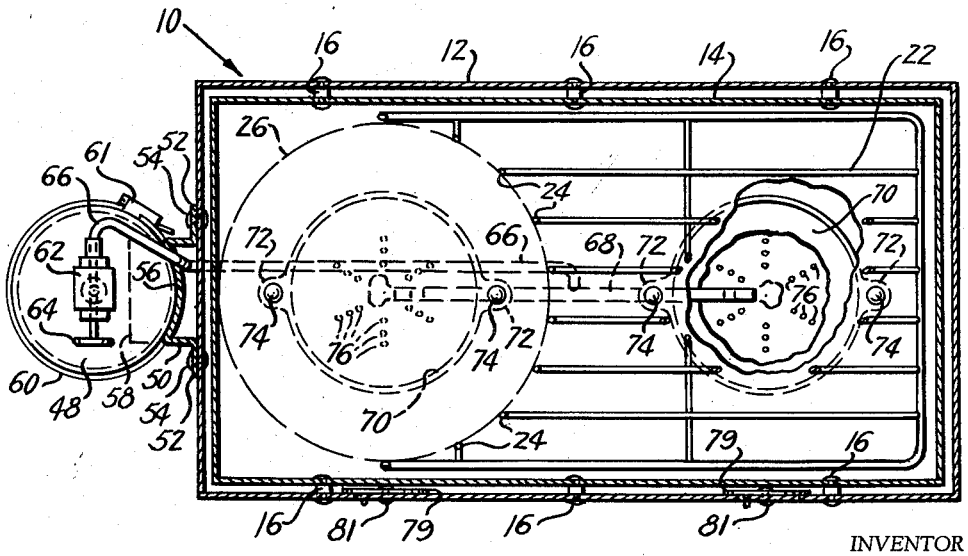
Fig. 2 is a sectional view taken on line 2—2 of Fig. 1.

The container 14 is provided on the bottom wall within the interior thereof with a rack 22 which, at one end, is formed with semi-circular contour defined by upstanding ends of the rack wires (indicated at 24 in Fig. 2) to permit the firm seating between it and the adjacent end wall of the container 14 of a low, squat, widemouthed jar 26 of the Mason jar type; this jar being adapted to be capped in the usual manner of Mason jars. At its upper edge, the container is provided with a concave lid 28 hinged at one side to the neck portion 30 of the container 14, as at 32, and provided with a flange 34 at its opposite side; this flange 34 being adapted to overlap the neck 30 when the lid 28 is in closed position. When in such closed position, slotted lever-type latch means 36 on the outside of casing 12 are adapted to engage lugs 38 on the flange 34 to releasably lock the lid 28 in place. It should be noted that when the lid 28 is in open position (as in Fig. 3) it rests on the adjacent edge of the casing 12 which acts as a stop to limit backward hinged movement of the lid 28.

The casing 12 is provided on its underside with knobs 40 acting as supporting feet for the unit when it is put down on a supporting surface while the lid 28 is provided with a carrying handle 42 connected to lid 28 by straps 44 and rivets 46; this handle 42 being used when lid 28 is closed and latched in place.

Mounted at one end of casing 12 is a tank 48 adapted to hold a combustible gas such as propane or the like. The tank 48 is releasably held in place by a bracket 50 having opposite flanges 52 connected to the end wall of the casing 12 by rivets 54 or the like. The bracket 50 is provided with a concave face 56 adapted to snugly receive a peripheral portion of the tank 48 and is also provided with an extension plate 58 at the bottom in a position to support the underside of the tank 48. A strap 60 having a fastening means 61 releasably encompasses the tank 48.

A valve means 62 operated by a manual means 64 is provided on the top wall of tank 48 in fluid communication with the interior of the tank. The valve means 62 is connected by a tube of copper or the like, shown at 66, to a piece of copper tubing 68 within the casing 12 below the bottom of container 14. This tubing 68 is provided with needle-sized holes, one in each end, to permit a very minute amount of gas to escape. Each of these holes comprises a small burner unit.

Above the burner units at each end of tubing 68 there is adapted to be positioned a heat-diffuser plate 70; these diffuser plates 70 being connected to the undersurface of the container 14 by means of flanges 72 and rivets or the like, shown at 74.

On the bottom surface of casing 12, below each flame propagated at the ends of tubing 68, there are provided a series of radially-arranged holes 76 to permit air intake and cause circulation of heated air. These holes are so arranged as to extend a short distance in all directions from the actual flames, leaving a small solid portion directly below the flame. This makes the device completely safe insofar as concerns any fire hazards.

On the front wall of casing 12, in the lower portion thereof, are provided two spaced holes 78; one hole 78 corresponding in position to each flame propagated at the ends of tubing 68. Movable or hinged covers 79 are mounted on the inside of the casing 12 for each hole 78. For example, these covers or doors 79 may be simple pieces of metal attached with one small bolt 81 to permit pushing them sideways to open or closed position. The holes 78 permit insertion of a match or other ignition means for igniting the burners at each end of tubing 68.

In order to keep certain foods, such as raw fruits, etc. cool, there may be provided in the bottom of concave lid 28 a heat-insulating flap or plate 80. This plate 80 is removable and is retained in place by a spring wire 82 such as would ordinarily be used in this type of device to hold a thermos bottle in place. On the other hand, if it is desired to use the upper portion of lid 28 as an additional heated space, the plate 80 can be replaced with a wire rack 84. The rack 84 is also adapted to be retained in position by spring 82. In the same manner, if more intense heat is desired for foods, or food containers within container 14, the rack 22 may be removed to provide direct contact with the directly-heated bottom wall of the container 14.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A combination convertible lunch box and lunch heater comprising an outer casing and an inner container, said outer casing having opposed side walls, opposed end walls, and a bottom wall connected to said side and end walls, said inner container comprising a floor and opposed side walls and opposed end walls connected to said floor, spacer means securing said inner container within said outer casing with said container floor spaced above said casing bottom wall providing a heating compartment and with the container walls spaced within the casing walls providing a flue for the heating compartment, said securing means comprising a plurality of spaced apart rivets secured between corresponding walls of said casing and container and spacer sleeves on said rivets between said walls, said rivets being secured adjacent said floor of said container, and a peripheral perforated plate securing the top ends of said casing walls to adjacent portions of said container side and end walls, said container side and end walls extending above said perforated plate in an inwardly reduced neck, a concave lid having depending front and rear flanges and end walls, said lid flanges and end walls being of the same length as the length of the lower portions of the container side and end walls below said neck, and said lid being hinged at its rear flange to the reduced neck of said container whereby in closed position, said lid flanges and end walls are in the same respective planes with said lower portions of said container side and end walls, and said flue between said container and said casing is open to atmosphere through said perforated plate, a gas burner means mounted in said heating compartment and means for detachably securing a burner gas supply means to one end wall of said casing and to said gas burner means.

2. The combination convertible lunch box and lunch heater of claim 1, said gas burner means comprising an elongated tube extending beneath said container floor, a pair of spaced apart heat diffuser plates secured to the bottom of said container floor, said tube having gas burner apertures therein beneath each said heat diffuser plate, said casing bottom wall having air supply apertures beneath each said heat diffuser plate, and spaced supporting legs on the bottom of said casing bottom wall.

3. The combination convertible lunch box and lunch heater of claim 1, and a heat insulating partition removably secured in said lid separating the inner area of said lid from said container when said lid is in closed position.

4. The combination convertible lunch box and lunch heater of claim 1, and a heat circulating wire supporting rack removably secured in said lid.

References Cited in the file of this patent

UNITED STATES PATENTS

| | | |
|---|---|---|
| 608,591 | Gants | Aug. 9, 1898 |
| 971,735 | Edwards | Oct. 4, 1910 |
| 1,058,601 | Knittel | Apr. 8, 1913 |
| 1,090,056 | Hildum | Mar. 10, 1914 |
| 1,435,521 | Heimerl | Nov. 14, 1922 |
| 2,097,186 | Hinnenkamp | Oct. 26, 1937 |
| 2,513,218 | Turnipseed | June 27, 1950 |

UNITED STATES PATENT OFFICE
CERTIFICATE OF CORRECTION

Patent No. 2,973,756                          March 7, 1961

John A. Tylle

It is hereby certified that error appears in the above numbered patent requiring correction and that the said Letters Patent should read as corrected below.

Column 1, lines 20 and 21 and column 3, line 2, for "thermos", each occurrence, read -- vacuum --.

Signed and sealed this 19th day of December 1961.

(SEAL)
Attest:

ERNEST W. SWIDER
Attesting Officer

DAVID L. LADD
Commissioner of Patents

USCOMM-DC